(12) United States Patent
Hirose (10) Patent No.: US 8,810,212 B2
(45) Date of Patent: Aug. 19, 2014

(54) MICROCOMPUTER AND SWITCHING POWER SUPPLY DEVICE WITH AUXILIARY SWITCH

(75) Inventor: Shinichi Hirose, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 730 days.

(21) Appl. No.: 13/104,563

(22) Filed: May 10, 2011

(65) Prior Publication Data

US 2011/0279105 A1    Nov. 17, 2011

(30) Foreign Application Priority Data

May 14, 2010  (JP) .................................. 2010-112034

(51) Int. Cl.
*H02M 3/155*  (2006.01)
*H02M 3/156*  (2006.01)
*H02M 1/00*  (2006.01)
*H02M 3/158*  (2006.01)

(52) U.S. Cl.
CPC ...... *H02M 3/156* (2013.01); *H02M 2001/0003* (2013.01); *H02M 3/1584* (2013.01)
USPC .......................................... 323/222; 323/285

(58) Field of Classification Search
CPC .............. H02M 3/1588; H02M 3/156; H02M 2001/0003; Y02B 70/1466
USPC ................................................ 323/271, 282
See application file for complete search history.

(56) References Cited

U.S. PATENT DOCUMENTS

| | | | | |
|---|---|---|---|---|
| 5,532,652 | A | * | 7/1996 | Koyama et al. .......... 331/116 FE |
| 6,570,369 | B2 | * | 5/2003 | Tamai et al. ................... 323/288 |
| 7,317,302 | B1 | * | 1/2008 | Collins .......................... 323/222 |
| 8,310,216 | B2 | * | 11/2012 | Canfield et al. ............... 323/223 |

FOREIGN PATENT DOCUMENTS

JP        2006-325281        11/2006

* cited by examiner

*Primary Examiner* — Rexford Barnie
*Assistant Examiner* — Elim Ortiz
(74) *Attorney, Agent, or Firm* — McDermott Will & Emery LLP (57) ABSTRACT

The present invention provides a switching power supply device that is capable of steadily operating even when a low supply voltage is employed. The present invention also provides a microcomputer equipped with the switching power supply device. A switching regulator includes an inductor that inputs an external supply voltage at one end, a main switch that is coupled to another end of the inductor, an auxiliary switch that is coupled to the other end of the inductor in parallel with the main switch, and a rectifying/smoothing circuit having a diode and a capacitor. A switching operation of the main switch is controlled by a control signal generated from a PFM control circuit, which is driven by an internal supply voltage. A switching operation of the auxiliary switch is controlled by a control signal generated from a ring oscillator, which is driven by the external supply voltage.

5 Claims, 9 Drawing Sheets

PRIOR ART

MICROCOMPUTER AND SWITCHING POWER SUPPLY DEVICE WITH AUXILIARY SWITCH

CROSS-REFERENCE TO RELATED APPLICATIONS

The disclosure of Japanese Patent Application No. 2010-112034 filed on May 14, 2010 including the specification, drawings, and abstract is incorporated herein by reference in its entirety.

BACKGROUND

The present invention relates to a switching power supply device that generates an internal supply voltage by subjecting an externally supplied supply voltage to voltage conversion. The present invention also relates to a microcomputer equipped with the switching power supply device.

In recent years, battery-driven devices such as electronic devices tend to have lower power consumption. In line with such a tendency, there is an increasing demand that the electronic devices operate on lower voltage. A switching power supply circuit described, for instance, in JP-A-2006-325281 is a switching power supply device for use with such electronic devices. This switching power supply device outputs a power supply output voltage $V_{OUT}$ through a DC/DC converter when a power supply input voltage $V_{IN}$ is activated. The configuration disclosed in JP-A-2006-325281 is such that a signal of a ring oscillator circuit, which is biased by the power supply input voltage $V_{IN}$, turns on/off a switch of the DC/DC converter to raise the power supply output voltage $V_{OUT}$ without power supply output voltage feedback. According to JP-A-2006-325281, a comparator monitors the raised power supply output voltage $V_{OUT}$. When the power supply output voltage $V_{OUT}$ is raised to a predetermined value, the switching power supply device switches from a non-feedback voltage increase operation based on the ring oscillator circuit to a feedback switching operation based on a PWM (Pulse Width Modulation) comparator, and exercises pulse width control in accordance with the power supply output voltage $V_{OUT}$ until a target value is reached.

SUMMARY

However, the configuration employed by the switching power supply device described in JP-A-2006-325281 to switch between a non-feedback voltage increase operation based on ring oscillation and a feedback switching operation based on the PWM comparator is such that a switching unit is provided between the output terminals of the PWM comparator and ring oscillator circuit and a control circuit for a switch. Further, the output signal of a comparator exercises switching control over the switching unit to select one of the output of the PWM comparator and the output of the ring oscillator circuit and apply the selected output to the control circuit.

The comparator described in JP-A-2006-325281 operates on the power supply input voltage $V_{IN}$, compares the power supply output voltage $V_{OUT}$ against a reference voltage, and changes the operation of the switching unit. The comparator employs, for instance, an analog comparator circuit, and outputs either the power supply input voltage $V_{IN}$ or the power supply output voltage $V_{OUT}$, whichever has the greater absolute value.

When the switching power supply device starts operating in the above configuration upon activation of the power supply input voltage $V_{IN}$, the analog comparator circuit applies the power supply input voltage $V_{IN}$ to the switching unit. If, in this instance, the power supply input voltage $V_{IN}$ is extremely low and lower than a high level logic voltage of the switching unit, the switching unit provides unstable switching control. As a result, the non-feedback voltage increase operation based on ring oscillation is not normally performed.

To avoid the above-described problem, it is necessary for the switching power supply device described in JP-A-2006-325281 to set an allowable lower limit value of the power supply input voltage $V_{IN}$ in accordance with the minimum operating voltage of the switching unit. This limits the decrease in the power supply input voltage $V_{IN}$.

The present invention has been made in view of the above circumstances, and provides not only a switching power supply device capable of steadily operating on a low supply voltage, but also a microcomputer equipped with the switching power supply device.

According to one aspect of the present invention, there is provided a microcomputer including a power supply circuit. The power supply circuit includes a first oscillator, a first switching element, a second oscillator, a second switching element and a judgment circuit. The first oscillator can oscillate due to an externally supplied external supply voltage. The first switching element is controlled by an oscillation operation of the first oscillator. The second oscillator can oscillate due to an internal supply voltage that is generated by the oscillation operation of the first oscillator. The second switching element is controlled by an oscillation operation of the second oscillator. The judgment circuit judges whether the voltage level of the internal supply voltage is raised to an operating voltage of the second oscillator. The power supply circuit not only starts an oscillation of the second oscillator but also stops the first oscillator in accordance with the result of judgment, and supplies an internal supply voltage generated by the oscillation of the second oscillator to a separate circuit block of the microcomputer.

According to another aspect of the present invention, a transistor forming the first oscillator and the first switching element has the same structure as a transistor forming a central processing unit (CPU) or a digital peripheral circuit, which is one of separate circuit blocks of the microcomputer. A transistor forming the second oscillator, the second switching element, and the judgment circuit has the same structure as a transistor forming an input/output circuit, which is one of the separate circuit blocks of the microcomputer. The first oscillator and the first switching element may alternatively be formed by a transistor having a lower logic threshold voltage than a logic circuit forming the CPU or the digital peripheral circuit.

According to still another aspect of the present invention, there is provided a microcomputer including a switching power supply device and an internal circuit. The switching power supply device generates an internal supply voltage by increasing an externally supplied external supply voltage. The internal circuit operates upon receipt of the internal supply voltage. The switching power supply device includes an inductor, a main switch, an auxiliary switch, a rectifier element, an auxiliary switch control circuit, a main switch control circuit, and a judgment circuit. The external supply voltage is input to one end of the inductor. The main switch is coupled to the other end of the inductor. The auxiliary switch is coupled to the other end of the inductor in parallel with the main switch. The rectifier element is coupled between the other end of the inductor and an output terminal. The auxiliary switch control circuit is driven by the external supply voltage to provide on/off control of the auxiliary switch in accordance with a drive pulse having a predetermined frequency. The main switch control circuit is driven by the internal supply voltage to provide on/off control of the main switch in accordance with the deviation between the internal supply voltage and a reference voltage. The judgment circuit is driven by the external supply voltage to judge whether the internal supply voltage has reached a voltage required to assure a normal operation of the main switch control circuit. When it is judged that the internal supply voltage has reached the voltage required to assure a normal operation of the main switch control circuit, the judgment circuit stops an operation of the auxiliary switch control circuit and enables the main switch control circuit.

The present invention permits the switching power supply device to perform a stable operation even at a low supply voltage. This enables the microcomputer to operate on low voltage.

BRIEF DESCRIPTION OF THE DRAWINGS

An embodiment of the present invention will be described in detail based on the following figures, in which.

DETAILED DESCRIPTION

An embodiment of the present invention will now be described with reference to the accompanying drawings. Like elements in the drawings are designated by the same reference numerals and will not be redundantly described.

Figure 1:
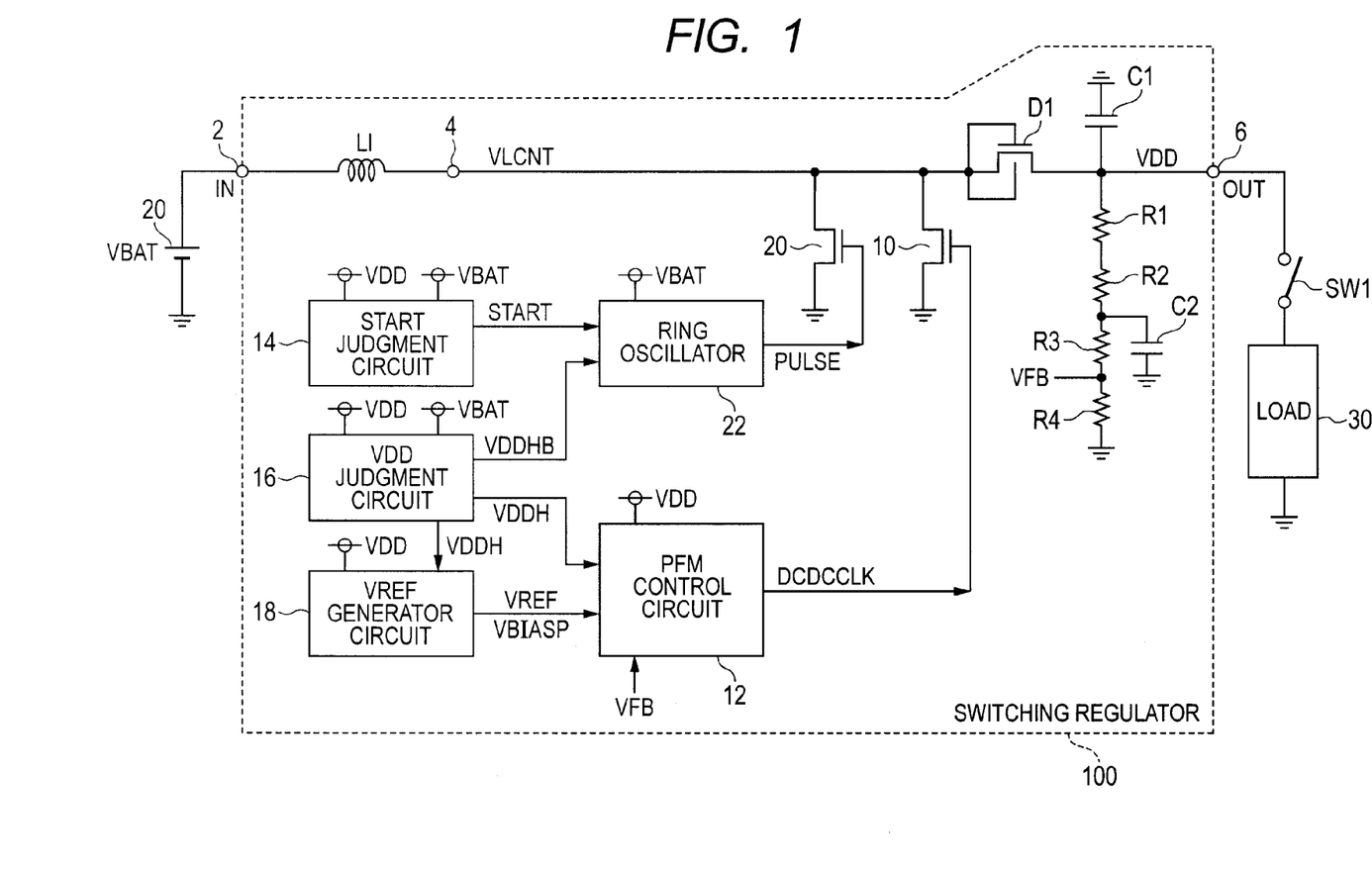
FIG. 1 is a circuit diagram illustrating an example configuration of a switching power supply device according to an embodiment of the present invention.

FIG. 1 is a circuit diagram illustrating an example configuration of a switching power supply device according to the embodiment of the present invention.

Referring to FIG. 1, the switching power supply device according to the embodiment of the present invention is, for example, an inductor-based, non-isolated switching regulator 100. The switching regulator 100 is incorporated, for instance, in a microcomputer that controls electronic devices, and increases an externally supplied supply voltage (which may be hereinafter referred to as the external supply voltage) VBAT to generate an internal supply voltage VDD. The internal supply voltage VDD generated by the switching regulator 100 is supplied to a load 30 corresponding to internal circuits of the microcomputer.

Plural supply voltages are supplied to the internal circuits of the microcomputer. In general, however, a logic circuit, which provides arithmetic processing, includes a core transistor driven by a low supply voltage, whereas an input/output circuit (I/O), which exchanges signals with a separate chip, includes an I/O transistor driven by a high supply voltage. A typical I/O transistor operates on a supply voltage (VIO) of approximately 3.0 V and is designed for relatively high voltage, whereas a typical core transistor operates on a supply voltage (VDL) of as low as approximately 1.5 V and is designed for relatively low voltage.

The voltage supplied from the switching regulator 100 varies depending on whether a target internal circuit to which the output voltage VDD supplied is an input/output circuit or a core circuit including, for instance, a CPU. To generate voltages to be supplied to different internal circuits, the switching regulator 100 may include a voltage decrease circuit for not only generating the supply voltage VIO for the input/output circuit but also decreasing the output voltage VIO for the input/output circuit to the supply voltage VDL for the core circuit. Another alternative is to use separate switching regulators that output the output voltage VIO and the output voltage VDL, respectively.

The switching regulator 100 is a step-up switching regulator that increases the external supply voltage VBAT, which is given to an input node 2, to the supply voltage VIO (approximately 3.0 V) for the I/O transistor, and outputs the increased voltage from an output node 6 as the output voltage VDD. The external supply voltage VBAT is lower than a logic voltage level for the input/output circuit (I/O), that is, lower than the operating voltage for the I/O transistor, and within an approximate range of 0.8 V to 1.7 V.

The switching regulator 100 includes an input node 2, an inductor L1, a main switch 10, an auxiliary switch 20, a diode D1, capacitors C1, C2, resistors R1 to R4, and an output node 6.

The input voltage (external supply voltage) VBAT is applied to the input node 2. One end of the inductor L1 is coupled to the input node 2, and the other end of the inductor L1 is coupled to an anode of the diode D1. The diode D1 includes, for instance, a diode-coupled NMOS (N-channel Metal Oxide Semiconductor) transistor. A cathode of the diode D1 is coupled to one end of the capacitor C1. The other end of the capacitor C1 is coupled to a ground node (ground voltage VSS). One end of the capacitor C1 serves as the output node 6 for the switching regulator 100 and outputs an output voltage (internal supply voltage) VDD to the load 30.

The resistors R1 to R4 are coupled in series between one end of the capacitor C1 (output node 6) and the ground node VSS. The capacitor C2 is coupled between the ground node VSS and a coupling node for the resistors R2, R3. A coupling node for the resistors R3, R4 is coupled to an input node for a PFM (Pulse Frequency Modulation) control circuit 12.

The main switch 10 is coupled between the ground node VSS and the other end of the inductor L1. The auxiliary switch 20 is coupled between the ground node VSS and the other end of the inductor L1 in parallel with the main switch 10. The main switch 10 and the auxiliary switch 20 respectively perform a switching operation in accordance with an input control signal to provide output control of the input voltage VBAT. The main switch 10 and the auxiliary switch 20 each include an I/O transistor such as an NMOS transistor.

In the switching regulator 100, all circuits other than the inductor L1 and capacitor C1 may be integrated into a single IC (semiconductor integrated circuit). Alternatively, such an IC may exclude the inductor L1, capacitor C1, and diode D1.

As control circuits for controlling the switching operations of the main switch 10 and auxiliary switch 20, the switching regulator 100 further includes a ring oscillator 22, a PFM control circuit 12, a start judgment circuit 14, a VDD judgment circuit 16, and a VREF generator circuit 18.

The ring oscillator 22 is coupled to a gate of the NMOS transistor included in the auxiliary switch 20. The auxiliary switch 20 turns on and off in accordance with a control signal PULSE output from the ring oscillator 22. The ring oscillator 22 operates on the input voltage VBAT. As described later, the ring oscillator 22 is configured so that the inputs and outputs of an odd number of inverters are unidirectionally coupled to form a closed loop. Although the ring oscillator 22 is at a disadvantage in that its oscillation frequency varies with the supply voltage, it can perform an oscillation operation over a wide supply voltage range from a low supply voltage to a high supply voltage. It is therefore used as a signal source during a startup sequence during which circuit operations are likely to be unstable due to a low input voltage VBAT.

The PFM control circuit 12 operates on the output voltage VDD. A reference voltage VREF, which is generated by the VREF generator circuit 18, and a divided voltage VFB, which is obtained by allowing the resistors R1 to R4 to divide the output voltage VDD, are input into the PFM control circuit 12. The PFM control circuit 12 compares the divided voltage VFB against the reference voltage VREF, and controls the switching operation of the main switch 10 so that the divided voltage VFB agrees with the reference voltage VREF. More specifically, the PFM control circuit 12 generates a control signal DCDCCLK by exercising PFM control in accordance with the deviation between the divided voltage VFB and the reference voltage VREF and outputs the generated control signal DCDCCLK to a gate of the NMOS transistor included in the main switch 10.

The input voltage VBAT and the output voltage VDD are input into the start judgment circuit 14, which operates on the input voltage VBAT. When the input voltage VBAT is activated, the start judgment circuit 14 outputs a start command START to the ring oscillator 22. More specifically, the start judgment circuit 14 has a predetermined value VSTART (e.g., 0.8 V) based on the minimum operating voltage of the ring oscillator 22 and compares the input value VBAT against the predetermined value VSTART. When the input voltage VBAT is not lower than the predetermined value VSTART, the start judgment circuit 14 outputs the start command START, which is activated to a high level, to the ring oscillator 22.

The input voltage VBAT and the output voltage VDD are input into the VDD judgment circuit 16, which operates on the input voltage VBAT. The VDD judgment circuit 16 monitors the output voltage VDD to judge whether the output voltage VDD is higher than a predetermined threshold value VSTD. The VDD judgment circuit 16 outputs judgment signals VDDHB, VDDH, which indicate the result of judgment, to the ring oscillator 22 and the PFM control circuit 12, respectively. The threshold value VSTD is predetermined to be not lower than a lower-limit voltage value (minimum operating voltage) required to assure a normal operation of the PFM control circuit 12.

More specifically, the VDD judgment circuit 16 generates the judgment signal VDDHB, which goes high when the output voltage VDD is not higher than the threshold value VSTD and goes low when the output voltage VDD exceeds the threshold value VSTD, and outputs the generated judgment signal VDDHB to the ring oscillator 22. Further, the VDD judgment circuit 16 generates the judgment signal VDDH, which goes low when the output voltage VDD is not higher than the threshold value VSTD and goes high when the output voltage VDD exceeds the threshold value VSTD, and outputs the generated judgment signal VDDH to the PFM control circuit 12.

The ring oscillator 22 starts its oscillation operation when it receives a high-level start command START from the start judgment circuit 14 and a high-level judgment signal VDDHB from the VDD judgment circuit 16. The auxiliary switch 20 then turns on/off in accordance with the control signal PULSE generated by the ring oscillator 22. When the judgment signal VDDHB changes from the high level to the low level, that is, when the output voltage VDD exceeds the threshold value VSTD, the ring oscillator 22 stops its oscillation operation. After the oscillation operation is stopped, the level of the control signal PULSE generated by the ring oscillator 22 remains low. This causes the NMOS transistor included in the auxiliary switch 20 to remain off.

The VREF generator circuit 18 operates on the output voltage VDD. The judgment signal VDDH is input into the VREF generator circuit 18 from the VDD judgment circuit 16. When the judgment signal VDDH goes high, the VREF generator circuit 18 generates the reference voltage VREF and a bias voltage VBIASP from the output voltage VDD. The generated reference voltage VREF and bias voltage VBIASP are then output to the PFM control circuit 12. The bias voltage VBIASP is to be applied to an analog circuit included in the PFM control circuit 12.

The PFM control circuit 12 stops its PFM control operation when it receives a low-level judgment signal VDDH from the VDD judgment circuit 16, that is, when the output voltage VDD is not higher than the threshold value VSTD. The control signal DCDCCLK output from the PFM control circuit 12 then remains low. This causes the NMOS transistor included in the main switch 10 to remain off. The PFM control circuit 12 starts a PFM control operation in accordance with the deviation between the divided voltage VFB and the reference voltage VREF when it receives a high-level judgment signal VDDH from the VDD judgment circuit 16 and the reference voltage VREF and bias voltage VBIASP from the VREF generator circuit 18. This causes the main switch 10 to turn on/off in accordance with the control signal DCDCCLK generated from the PFM control circuit 12.

In other words, the switching regulator 100 according to the present embodiment selectively allows one of the main switch 10 and the auxiliary switch 20 to perform a switching operation in accordance with the control signals PULSE, DCDCCLK, which are respectively generated from the ring oscillator 22 and the PFM control circuit 12. This eliminates the necessity of a switching unit that selects one of the control signal PULSE and the control signal DCDCCLK and applies the selected signal to a switch.

Consequently, the main switch 10 establishes drain-source coupling in a high-resistance state no matter whether the output DCDCCLK of the PFM control circuit coupled to a gate electrode of the main switch 10 is subjected to voltage changes while the operations of the PFM control circuit and VREF generator circuit 18 cannot be guaranteed due to an insufficiently raised output voltage VDD of the switching regulator 100. As a result, a current in the auxiliary switch 20 is more dominant than a current in the main switch 10. This makes it possible to reduce the influence on the increase in the output voltage VDD.

After the output voltage VDD is raised to the extent that the operations of the PFM control circuit 12 and VREF generator circuit 18 can be guaranteed, the main switch 10 can establish or break the drain-source coupling. Therefore, the auxiliary switch 20 is placed in an open state with the ring oscillator 20 stopped. After the output voltage VDD is raised, therefore, it is possible to reduce not only the consumption of the battery voltage VBAT due to a continued oscillation of the ring oscillator 22, but also the influence on the output voltage VDD due to on/off control of the auxiliary switch 20.

Figure 2:
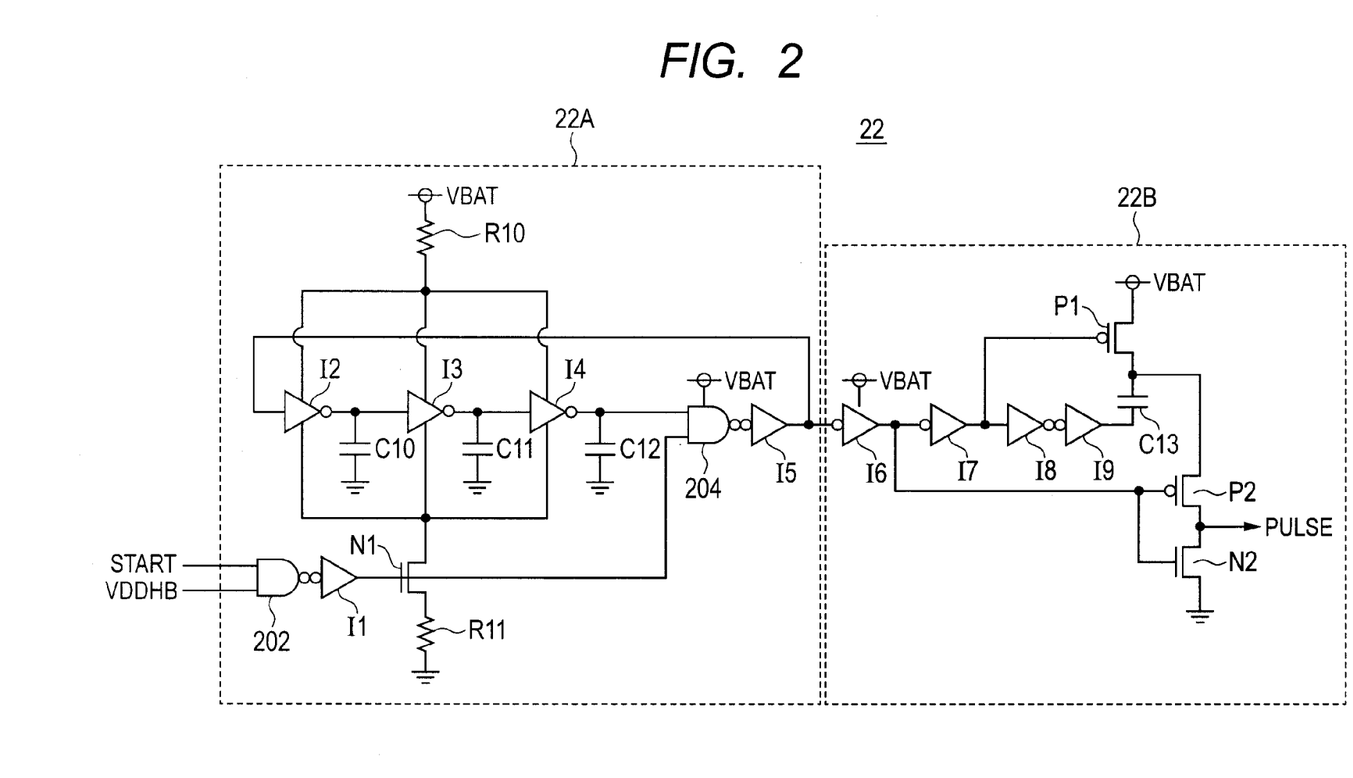
FIG. 2 is a diagram illustrating an example configuration of a ring oscillator shown in FIG. 1.

FIG. 2 is a diagram illustrating an example configuration of the ring oscillator 22 shown in FIG. 1. Referring to FIG. 2, the ring oscillator 22 operates on the input voltage VBAT. The ring oscillator 22 includes a ring oscillator circuit 22A and a boost circuit 22B. The ring oscillator circuit 22A performs an oscillation operation. The boost circuit 22B increases the amplitude of an output signal of the ring oscillator circuit 22A. These circuits 22A, 22B each include a core transistor.

The ring oscillator circuit 22A includes inverters I2 to I5, a NAND circuit 204, capacitors C10 to C12, a resistor R10, an NMOS transistor N1, a resistor R11, a NAND circuit 202, and an inverter I1. The inverters I2 to I5 and the NAND circuit 204 are coupled in a ring form. The capacitors C10 to C12 are coupled between the ground voltage VSS and the output nodes of the inverters I2 to I4. The resistor R10 is coupled between a power supply node (external supply voltage VBAT) and high-level power supply nodes of the inverters I2 to I4. The NMOS transistor N1 and the resistor R11 are coupled between the ground node (ground voltage VSS) and low-level power supply nodes of the inverters I2 to I4.

The NAND circuit 202 receives the start command START from the start judgment circuit 14 (FIG. 2) at a first input node, and receives the judgment signal VDDHB from the VDD judgment circuit 16 (FIG. 2) at a second input node. An output signal of the NAND circuit 202 is input not only into a gate of the NMOS transistor N1 through the inverter I1, but also into a second input terminal of the NAND circuit 204.

When the start command START and the judgment signal VDDHB are both high, the NMOS transistor N1 turns on so that an operating current flows to each of the inverters I2 to I4. A closed loop formed by the inverters I2 to I5 and NAND circuit 204 then starts an oscillation operation.

The boost circuit 22B increases the amplitude of an output signal of the inverter I5. This circuit 22B includes inverters I6 to I9, a PMOS (P-channel Metal Oxide Semiconductor) transistor P1, a capacitor C13, a PMOS transistor P2, and an NMOS transistor N2. The inverters I6 to I9 are cascade-coupled. The PMOS transistor P1 and the capacitor C13 are coupled between the power supply node VBAT and an output node of the inverter I9. The PMOS transistor P2 and the NMOS transistor N2 are coupled between the ground node VSS and coupling nodes of the PMOS transistor P1 and capacitor C13.

Gates of the PMOS transistor P2 and NMOS transistor N2 are commonly coupled to an output node of the inverter I6. When the PMOS transistor P1 is conducting, the PMOS transistor P2 and the NMOS transistor N2 form a CMOS inverter, which inverts and buffers an output signal of the inverter I6 to generate the control signal PULSE having a large amplitude.

In the ring oscillator 22, the inverters I2 to I5 and the NAND circuit 204, which receive the external supply voltage VBAT, perform an oscillation operation as described above to let the boost circuit 22B increase the amplitude of the output signal from the inverter I5. The inverters I2 to I5 and the NAND circuit 204, which are included in the ring oscillator circuit 22A, operate on the external supply voltage VBAT because the output voltage VDD is inadequate for driving purposes before it is raised.

Figure 3:
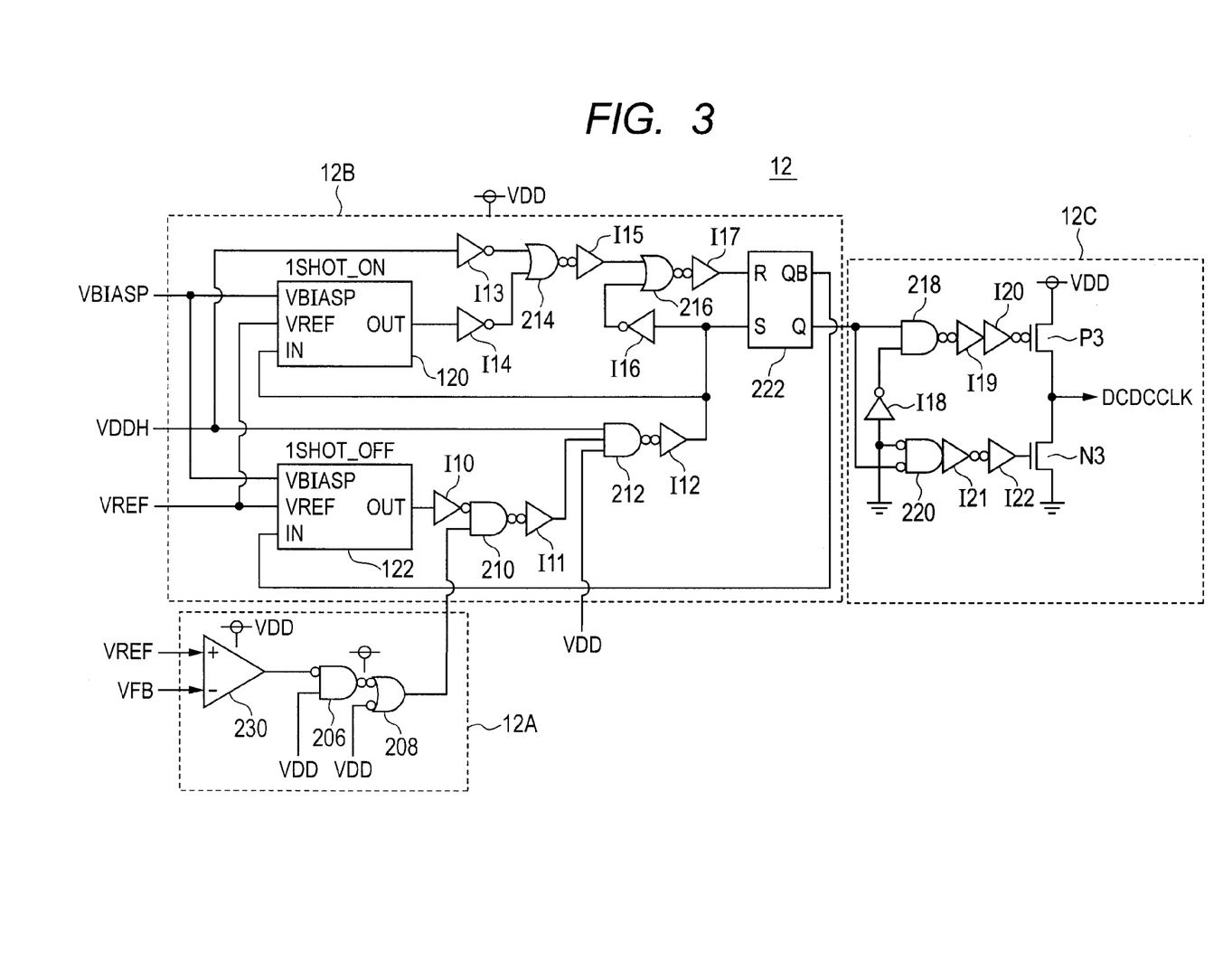
FIG. 3 is a diagram illustrating an example configuration of a PFM control circuit shown in FIG. 1.

FIG. 3 is a diagram illustrating an example configuration of the PFM control circuit 12 shown in FIG. 1. Referring to FIG. 3, the PFM control circuit 12 operates on the output voltage VDD. The PFM control circuit 12 includes a comparator circuit 12A, a PFM signal generator circuit 12B, and a driver circuit 12C. The comparator circuit 12A includes a comparator 230. The PFM signal generator circuit 12B generates a PFM signal in accordance with an output signal of the comparator circuit 12A. The driver circuit 12C generates the control signal DCDCCLK for the main switch 10 by increasing the drive capacity of the generated PFM signal. These circuits 12A to 12C each include an I/O transistor.

The comparator circuit 12A includes a comparator 230, a NAND circuit 206, and a NAND circuit 208. The NAND circuit 206 receives an output signal of the comparator 230 at a first input node and receives the output voltage VDD at a second input node. The NAND circuit 208 receives an output signal of the NAND circuit 206 at a first input node and receives the output voltage VDD at a second input node.

The comparator 230 operates on the output voltage VDD, receives the reference voltage VREF from the VREF generator circuit 18 (FIG. 2) at a non-inverted input node, and receives the divided voltage VFB at an inverted input node. The comparator 230 compares the divided voltage VFB against the reference voltage VREF, and outputs a binary signal indicative of the result of voltage comparison. The output signal of the comparator 230 is input into a second input node of a NAND circuit 210 through the NAND circuits 206, 208.

The PFM signal generator circuit 12B includes a one-shot on circuit 120, a one-shot off circuit 122, inverters I10 to I17, NAND circuits 210, 212, NOR circuits 214, 216, and an RS flip-flop 222. The one-shot on circuit 120 generates an on time Ton by using the bias voltage VBIASP as a bias voltage source for a constant current source. The one-shot off circuit 122 generates an off time Toff by using the bias voltage VBIASP as the bias voltage source for a constant current source.

The one-shot on circuit 120 sets the pulse width (on time Ton) of the PFM signal. The one-shot on circuit 120 uses a rising edge of an IN input signal as a trigger to output a constant on time Ton as an OUT signal. The one-shot off circuit 122 sets an off time Toff of the PFM signal. The one-shot off circuit 122 uses a rising edge of the IN input signal as a trigger to output a constant off time Toff as an OUT signal.

Figure 4A:
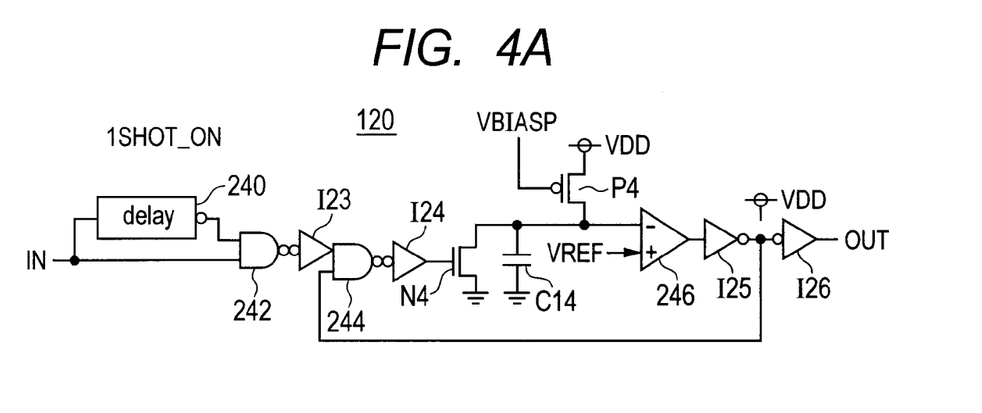
FIGS. 4A to 4C are diagrams illustrating example configurations of a one-shot on circuit and a one-shot off circuit, which are shown in FIG. 3.
Figure 4B:
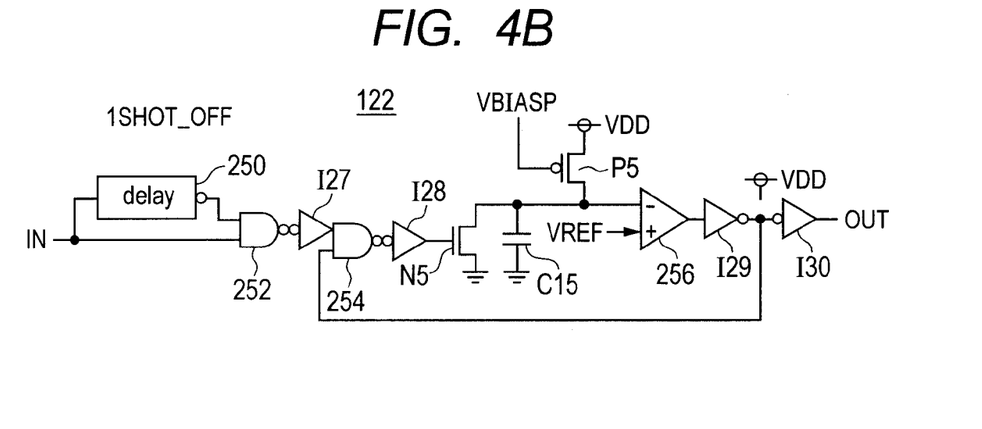
Figure 4C:
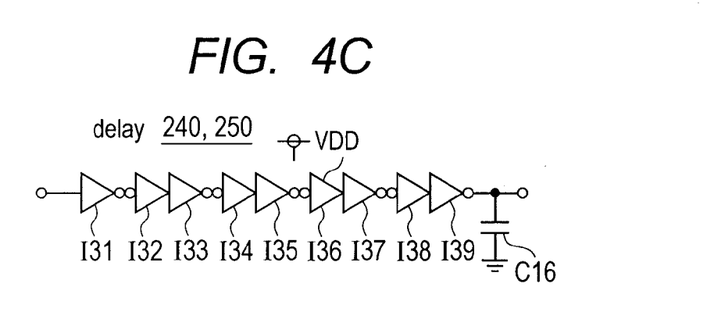

FIGS. 4A to 4C are diagrams illustrating example configurations of the one-shot on circuit 120 and one-shot off circuit 122, which are shown in FIG. 3. FIG. 4A shows the configuration of the one-shot on circuit 120. FIG. 4B shows the configuration of the one-shot off circuit 122. FIG. 4C shows the configuration of a delay circuit included in both the one-shot on circuit 120 and one-shot off circuit 122.

Referring to FIG. 4A, the one-shot on circuit 120 includes a delay circuit 240, NAND circuits 242, 244, inverters I23 to I26, a PMOS transistor P4, an NMOS transistor N4, a capacitor C4, and a comparator 246.

A first input node of the NAND circuit 242 is coupled to an input node of the one-shot on circuit 120 through the delay circuit 240. A second input node of the NAND circuit 242 is coupled to the input node of the one-shot on circuit 120. As shown in FIG. 3, the input node of the one-shot on circuit 120 is coupled to an output node of the inverter I12. Therefore, an output signal of the inverter I12 is input into the first input node of the NAND circuit 242 through the delay circuit 240, and the output signal of the inverter I12 is input into the second input node of the NAND circuit 242.

The delay circuit 240 is configured so that plural inverters I31 to I39 operating on the output voltage VDD are cascade-coupled as shown in FIG. 4C. A capacitor C16 is coupled between an output node of the inverter I39 and the ground node VSS. The number of cascade-coupled inverters is determined in such a manner as to obtain the time required for discharging a capacitor C14.

The above-described configuration ensures that the NAND circuit 242 in the one-shot on circuit 120 shown in FIG. 4A outputs a one-shot pulse signal having a duration appropriate for the delay circuit 240. The one-shot pulse signal is then input into a first input node of the NAND circuit 244 through the inverter I23. An output signal of the inverter I25 is input into a second input node of the NAND circuit 244. An output signal of the NAND circuit 244 is input into a gate of the NMOS transistor through the inverter I24.

The PMOS transistor P4 and the NMOS transistor N4 are coupled in series between a power supply node VDD and the ground node VSS. The PMOS transistor P4 receives the bias voltage VBIASP at its gate and operates as a constant current source. A coupling node between the PMOS transistor P4 and the NMOS transistor N4 is coupled to a non-inverted input node of the comparator 246. The capacitor C14 is coupled between the coupling node and the ground node VSS.

The capacitor C14 is initially charged to VDD by the PMOS transistor P4 so that the output of the inverter I25 coupled to the comparator 246 is high. The output of the inverter I23, on the other hand, is low when there is no change in the IN input signal. Therefore, the output of the inverter I24 coupled to the NAND circuit 244 is low, and the NMOS transistor N4 is off.

When the IN input signal rises in the resulting state, the NMOS transistor N4 is on for a period of time that is determined by the delay time of the delay circuit 240 or by the delay time propagated upon comparator reaction. This discharges the capacitor C14 nearly completely. When the NMOS transistor N4 remains on for the short period of time and then turns back off, the PMOS transistor P4, which is operating as a constant current source, starts to charge the capacitor C14. The output of the inverter I25 coupled to the comparator 246 is low for a predetermined period of time required for the capacitor C14 to become charged to the reference voltage VREF after being discharged. The OUT output of the inverter I26 is high while the output of the inverter I25 is low. In this manner, the one-shot on circuit 120 outputs a pulse signal defining the on time Ton.

An output signal of the one-shot on circuit 120 is input into a second input node of the NOR circuit 214 through the inverter I14. The signal VDDH is input into a first input node of the NOR circuit 214 through the inverter I13. An output signal of the NOR circuit 214 is input into a first input node of the NOR circuit 216 through the inverter I15. An input signal of a set input node S of the RS flip-flop 222 is input into a second input node of the NOR circuit 216 through the inverter I16.

Referring to FIG. 4B, the one-shot off circuit 122 has the same configuration as the one-shot on circuit 120 shown in FIG. 4A. An inverted output signal QB of the RS flip-flop 222 is input into an input node of the one-shot off circuit 122.

A PMOS transistor P5 and an NMOS transistor N5 are coupled in series between the power supply node VDD and the ground node VSS. The PMOS transistor P5 receives the bias voltage VBIASP at its gate and operates as a constant current source. A coupling node between the PMOS transistor P5 and the NMOS transistor N5 is coupled to an inverted input node of a comparator 256. A capacitor C15 is coupled between the coupling node and the ground node VSS.

The one-shot off circuit 122 differs from the one-shot on circuit 120 merely in circuit constant and in high-level pulse width only. Therefore, the one-shot off circuit 122 performs the same operation as the one-shot on circuit 120 to output a pulse signal defining the off time Toff.

An output signal of the one-shot off circuit 122 is input into a first input node of the NAND circuit 210 through the inverter I10. An output signal of the NAND circuit 208 is input into a second input node of the NAND circuit 210. An output signal of the NAND circuit 210 is input into a second input node of the NAND circuit 212 through the inverter I11. The judgment signal VDDH from the VDD judgment circuit 16 is input into a first input node of the NAND circuit 212, and the internal supply voltage VDD is input into a third input node of the NAND circuit 212. An output signal of the NAND circuit 212 is not only input into the set input node S of the RS flip-flop 222 through the inverter I12, but also input into the inverter I16 and the input node of the one-shot on circuit 120.

An output node Q of the RS flip-flop 222 is coupled through the driver circuit 12C to a gate of an NMOS transistor included in the main switch 10. In other words, the RS flip-flop 222 generates the PFM signal (output signal Q) having a pulse frequency f (=1/(Ton+Toff)) by using the pulse signal defining the on time Ton and the pulse signal defining the off time Toff.

The driver circuit 12C generates the control signal DCDCCLK for the main switch 10 by increasing the drive capacity of the PFM signal. Specifically, the driver circuit 12C includes a CMOS inverter, a NAND circuit 218, inverters I18 to I20, a NAND circuit 220, and inverters I21, I22. The CMOS inverter includes a PMOS transistor P3 and an NMOS transistor N3, re-inverts an inverted PFM signal, and generates the control signal DCDCCLK having an increased current drive capacity. The NAND circuit 218 and inverters I18 to I20 generate a gate signal of the PMOS transistor P3. The NAND circuit and inverters I21, I22 generate a gate signal of the NMOS transistor N3.

An operation of the switching regulator 100, which is configured as described above, will now be described with reference to FIG. 5 as well as FIG. 1.

Figure 5:
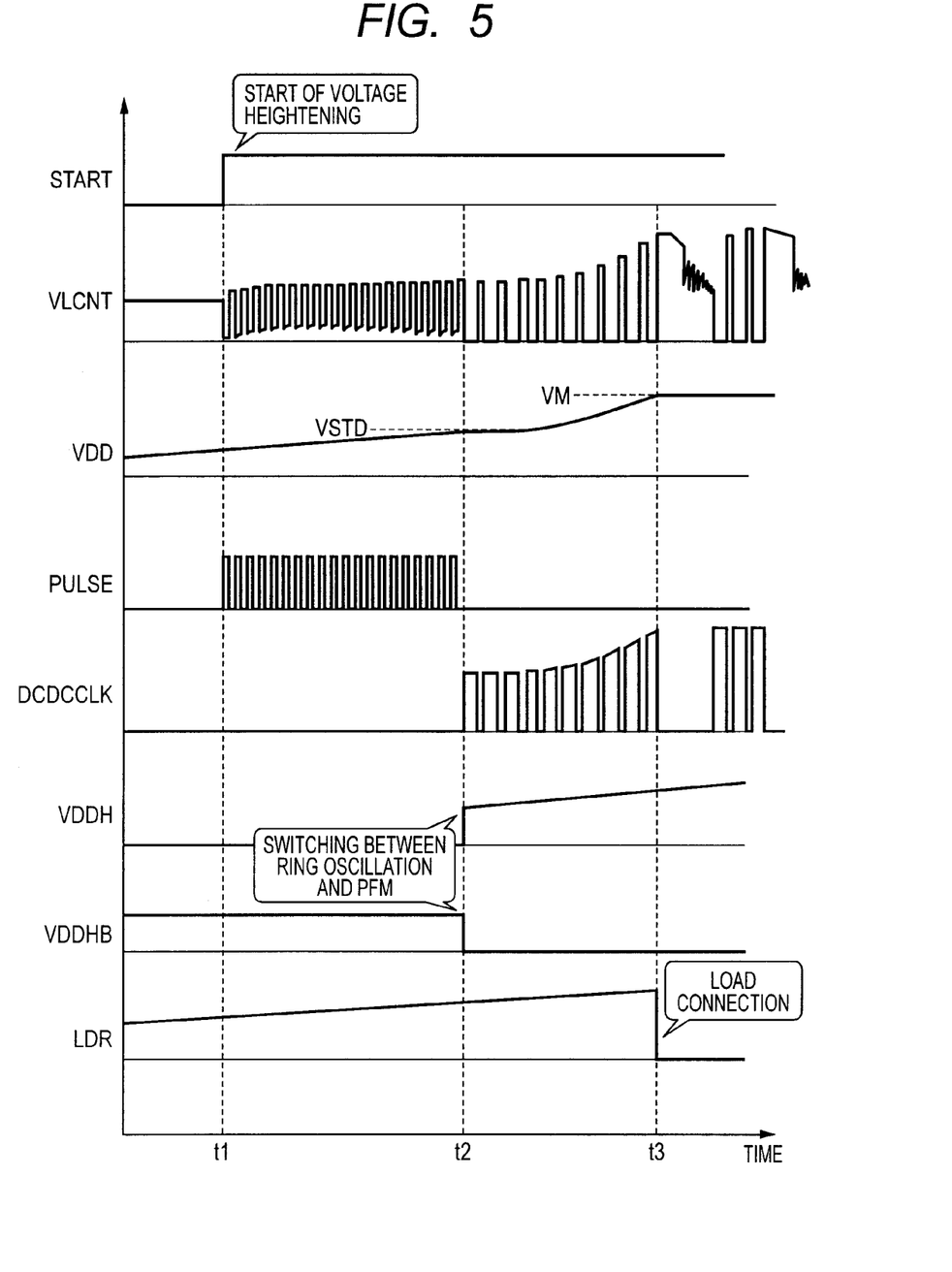
FIG. 5 is a timing diagram illustrating an operation of a switching regulator.

FIG. 5 is a timing diagram illustrating an operation of the switching regulator 100. Various voltage waveforms are shown in FIG. 5. From top to bottom, the voltage waveforms depict the start command START, the aforementioned other end of the inductor L1 (equivalent to the node N4 shown in FIG. 1), the output voltage (internal supply voltage VDD), the control signal PULSE for the auxiliary switch 20, the control signal DCDCCLK for the main switch 10, and the output signals (judgment signals VDDH, VDDHB) of the VDD judgment circuit 16. The voltage waveform shown at the bottom of FIG. 5 depicts a voltage LDR that drives the load 30.

Referring to FIG. 5, when the input voltage (external supply voltage) VBAT is not lower than the predetermined value VSTART at time t1, the start judgment circuit 14 (FIG. 1) outputs the start command START that is activated to the high level. In this instance, the output voltage (internal supply voltage) VDD is still not higher than the threshold value VSTD. Therefore, the VDD judgment circuit 16 outputs not only a high-level judgment signal VDDHB but also a low-level judgment signal VDDH.

Upon receipt of a high-level start command START and a high-level judgment signal VDDH, the ring oscillator 22 operates on the input voltage VBAT to start an oscillation operation. The ring-oscillator then generates the control signal PULSE and outputs it to the auxiliary switch 20.

At time t1, the control signal PULSE starts to provide on/off control of the auxiliary switch 20. More specifically, when the auxiliary switch 20 turns on, a current flows from the input node 2 through the inductor L1 and auxiliary switch

20. In this instance, electromagnetic energy is accumulated in the inductor L1. When the auxiliary switch 20 turns off later, the electromagnetic energy accumulated in the inductor L1 is accumulated in the smoothing capacitor C1 through the rectifying diode D1. In this instance, a voltage VLCNT having a rectangular waveform is developed at the node N4. The voltage VLCNT having a rectangular waveform is then rectified and smoothed by the diode D1 and the capacitor C1 to generate the output voltage VDD. As the auxiliary switch 20 performs a switching operation, the output voltage VDD gradually increases. The output voltage VDD is monitored by the VDD judgment circuit 16, divided by the resistors R1 to R4, and fed back to the PFM control circuit 12.

During a period before time t2, the PFM control circuit 12 receives the low-level judgment signal VDDH, and then inputs a low-level signal into the set input node S of the RS flip-flop 222 and a high-level signal into a reset input node R. When the RS flip-flop 222 outputs a high-level output signal Q, the driver circuit 12C outputs a low-level control signal DCDCCLK. Therefore, the NMOS transistor included in the main switch 10 receives the low-level control signal DCDC-CLK and remains off.

When the output voltage VDD increases due to the switching operation of the auxiliary switch 20 and exceeds the threshold value VSTD at time t2, the VDD judgment circuit 16 outputs not only a judgment signal VDDH activated to a high level but also a judgment signal VDDHB deactivated to a low level. The ring oscillator 22 then receives the low-level judgment signal VDDHB and stops its oscillation operation. Therefore, the control signal PULSE remains low after time t2, thereby causing the auxiliary switch 20 to remain off.

Meanwhile, when the PFM control circuit 12 receives the judgment signal VDDH activated to the high level, it operates on the output voltage VDD and starts to provide PFM control. The PFM control circuit 12 compares the voltage VFB, which is obtained by dividing the output voltage VDD, against the reference voltage VREF, and generates the control signal DCDCCLK based on PFM control to ensure that the divided voltage VFB agrees with the reference voltage VREF.

When the control signal DCDCCLK provides on/off control of the main switch 10 instead of the auxiliary switch 20, the output voltage VDD continues to increase after time t2. When the output voltage VDD reaches a target voltage VM at which the load 30 can steadily operate, a switch SW1 coupled between the output node 6 and the load 30 conducts and begins to supply the internal supply voltage VDD to the load 30.

As described above, the switching regulator 100 according to the present embodiment is configured so that the main switch 10 and the auxiliary switch 20 are disposed in parallel with each other and selectively used to charge the inductor L1 with the input voltage VBAT. In the above-described configuration, the selection between the main switch 10 and the auxiliary switch 20 is autonomously controlled by the control signal PULSE generated from the ring oscillator 22 and the control signal DCDCCLK generated from the PFM control circuit 12.

Consequently, the switching regulator 100 according to the present embodiment, which is configured as described above, does not require a switching unit to be installed between the main switch and the output terminals of the ring oscillator and PFM control circuit unlike previously used switching regulators that control the switching operation of the main switch by choosing between the control signal PULSE and the control signal DCDCCLK.

As mentioned earlier, it is demanded that the switching unit provide stable switching control in accordance with the output of an analog comparator circuit operating on the input voltage VBAT. Therefore, it is necessary to set an allowable lower limit value of the input voltage VBAT in accordance with the minimum operating voltage of the switching unit. This limits the decrease in the input voltage VBAT.

On the other hand, the switching regulator 100 according to the present embodiment eliminates the necessity of installing the switching unit. Therefore, the lower limit value of the input voltage VBAT is not restricted. Consequently, an increased voltage can be obtained even when the input voltage VBAT is low. As a result, the external supply voltage can be lowered.

Effects produced by the switching regulator 100 according to the present embodiment will now be described in detail in comparison with the effects produced by a common switching regulator shown in FIG. 6. The switching regulator shown in FIG. 6 is obtained by applying a control switching configuration of the switching power supply device described in JP-A-2006-325281 to an output current feedback type step-up switching regulator.

Figure 6:
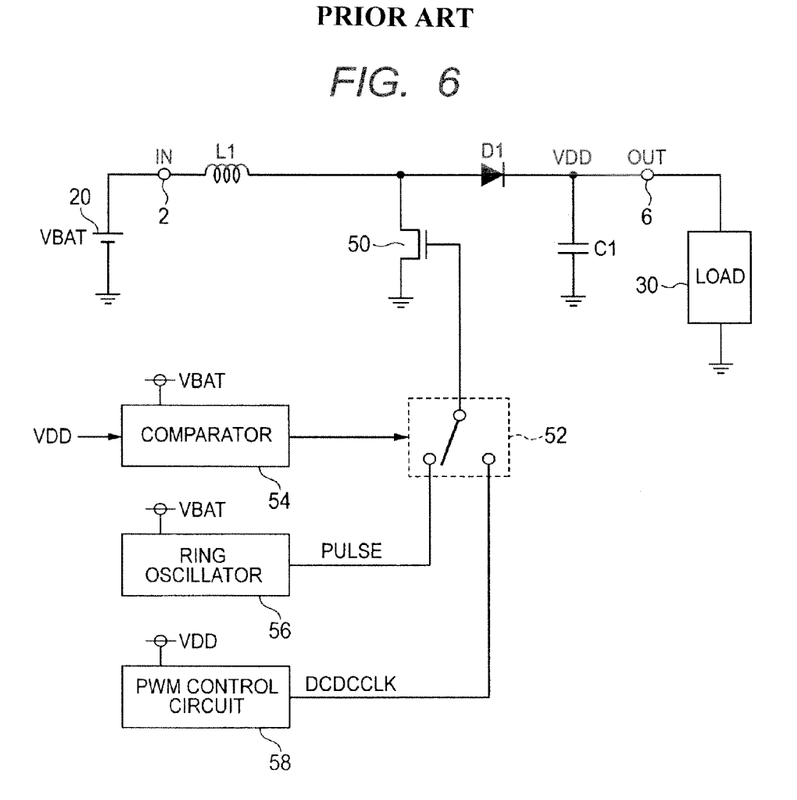
FIG. 6 is a diagram illustrating an example configuration of a common switching regulator.

Referring to FIG. 6, the switching regulator includes an inductor L1, a switch 50, a diode D1, and a capacitor C1. One end of the inductor L1 is coupled to an input node 2. The switch 50 is coupled between the other end of the inductor L1 and a ground node VSS. The diode D1 and the capacitor C1 function as a rectifying/smoothing circuit.

The switch 50 includes an NMOS transistor. The switching regulator additionally includes a ring oscillator 56, a PWM control circuit 58, a comparator 54, and a switching circuit 52. These additional components form a configuration for providing on/off control of the NMOS transistor.

The ring oscillator 56 operates on an input voltage VBAT and performs an oscillation operation to generate a control signal PULSE. The PWM control circuit 58 operates on an output voltage VDD and provides PWM control to generate a control signal DCDCCLK.

The comparator 54 operates on the input voltage VBAT, compares the output voltage VDD against a reference voltage, and outputs a signal indicative of the result of comparison. The switching circuit 52 is disposed between a gate of the NMOS transistor included in the switch 50 and the ring oscillator 56 and PWM control circuit 58.

The switching circuit 52 selects one of the control signal PULSE and the control signal DCDCCLK in accordance with an output signal of the comparator 54, and inputs the selected control signal into the switch 50. More specifically, when the output voltage VDD is not higher than the reference voltage, the switching circuit 52 selects the control signal PULSE and inputs the selected control signal into the switch 50. When, on the other hand, the output voltage VDD is higher than the reference voltage, the switching circuit 52 selects the control signal DCDCCLK and inputs the selected control signal into the switch 50.

Figure 7:
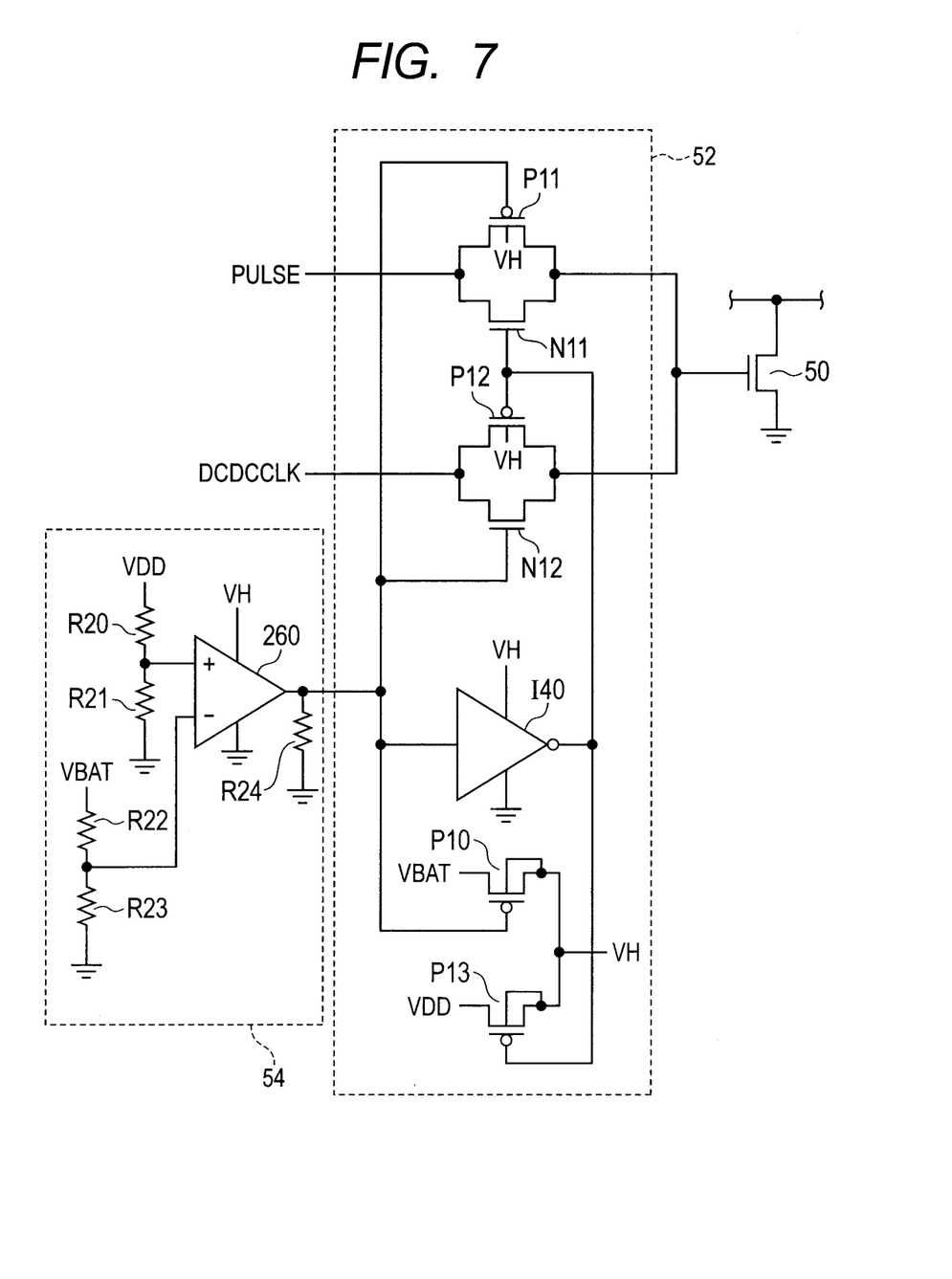
FIG. 7 is a diagram illustrating an example configuration of a comparator and a switching circuit, which are shown in FIG. 6.

FIG. 7 is a diagram illustrating an example configuration of the comparator 54 and switching circuit 52, which are shown in FIG. 6. Referring to FIG. 7, the comparator 54 includes a comparator 206 and resistors R20 to R24. The comparator 54 outputs one of a high-level signal (equivalent to a voltage VH in FIG. 7) and a low-level signal (ground voltage VSS) depending on whether VBAT is higher or lower than VDD. One of the external supply voltage VBAT and the output voltage VDD is selected as the voltage VH, whichever is higher.

The switching circuit 52 includes two MOS switches, which are coupled in parallel with an output node of the comparator 54. The MOS switch including a PMOS transistor P11 and an NMOS transistor N11 is disposed between the switch 50 and an output node of the ring oscillator 56 (not shown). The MOS switch including a PMOS transistor P12 and an NMOS transistor N12 is disposed between the switch 50 and an output node of the PWM control circuit 58 (not shown). These two MOS switches complementarily turn on/off in accordance with an output signal of the comparator 54. This ensures that one of the control signal PULSE and the control signal DCDCCLK is input into the switch 50 through a MOS switch that is turned on.

When, in the configuration shown in FIG. 7, the input voltage (external supply voltage) VBAT is low, it cannot sufficiently turn on the PMOS transistors P11, P12 of the comparator 54. The reason is that core circuit transistors whose minimum operating voltage is low cannot be used as the PMOS transistors P11, P12 from the viewpoint of breakdown voltage. To avoid this problem, it is necessary to set an allowable lower limit value of the input voltage VBAT in accordance with the minimum operating voltage of the switching circuit 52. This limits the decrease in the input voltage VBAT.

On the other hand, the switching regulator 100 according to the present embodiment permits at least the ring oscillator 22 and the auxiliary switch 20 to operate on the input voltage VBAT. This ensures that the selection between the main switch 10 and the auxiliary switch 20 is autonomously controlled in accordance with their respective control signals. Consequently, the switching circuit 52 shown in FIG. 7 need not be installed. As a result, the lower-limit value of the input voltage VBAT is no longer restricted. This makes it possible to obtain an increased voltage even when the input voltage VBAT is low. Thus, no practical problem occurs even when the external supply voltage is lowered.

In the present embodiment, which has been described above, it is assumed that a PWM control switching regulator is used as a switching power supply device. However, the present embodiment is also applicable to a PFM control switching regulator. Further, the circuit configurations of the components of the switching regulator described with reference to FIGS. 1 and 2 are to be considered in all respects only as illustrative and not restrictive.

Microcomputer Configuration

An example configuration of the microcomputer to which the switching power supply device according to the present embodiment is applied will now be described with reference to the accompanying drawings.

Figure 8:
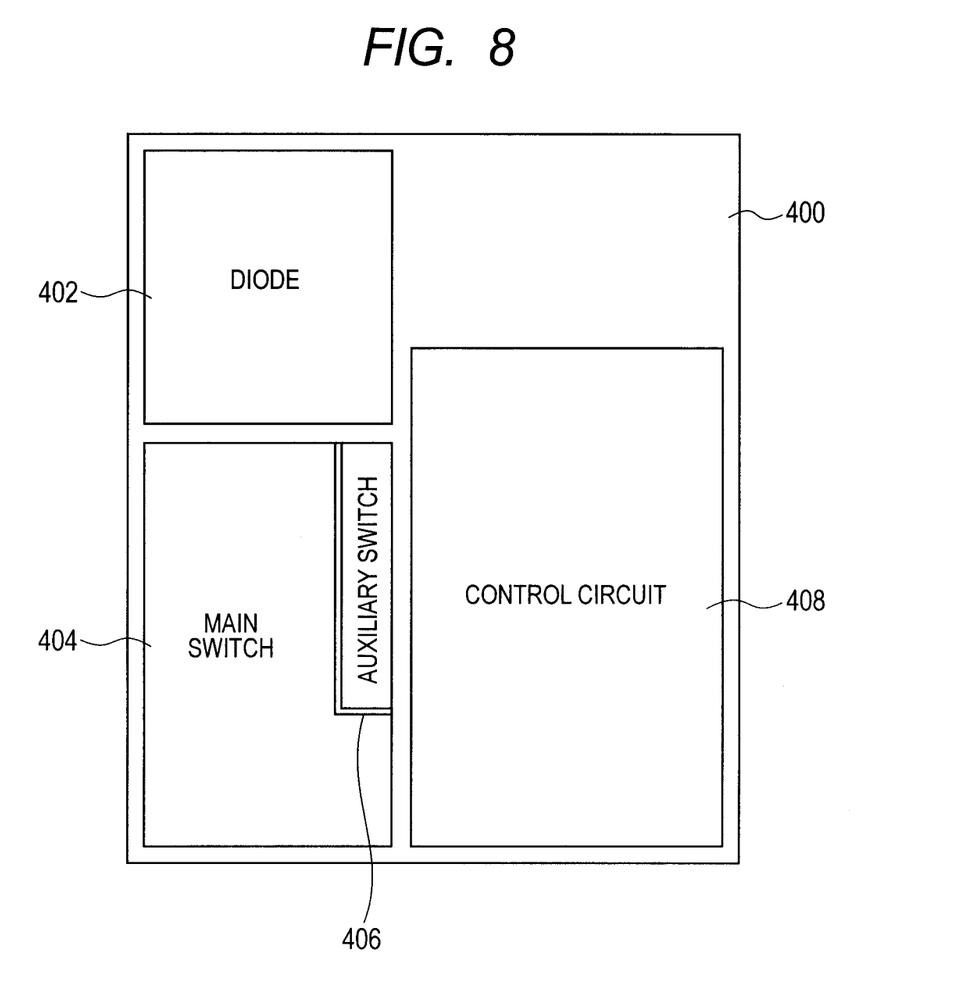
FIG. 8 is a diagram illustrating an example configuration of a switching regulator that is described as an example of the switching power supply device.
Figure 9:
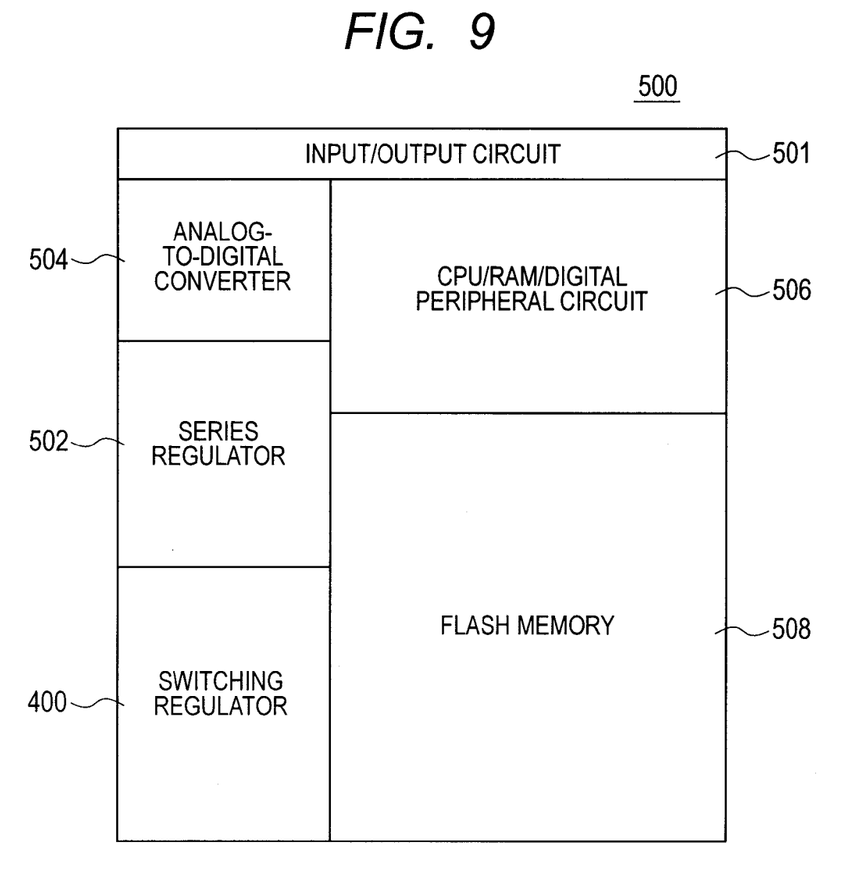
FIG. 9 is a diagram illustrating an example configuration of a microcomputer that includes the switching regulator shown in FIG. 8.

FIG. 8 is a diagram illustrating a configuration of the switching regulator that is described as an example of the switching power supply device. FIG. 9 is a diagram illustrating a configuration of the microcomputer that includes the switching regulator shown in FIG. 8.

Referring to FIG. 8, a main switch 404, an auxiliary switch 406, a diode 402, and a control circuit 408 are disposed in a rectangular semiconductor chip area 400. The main switch 404 and auxiliary switch 406 respectively correspond to the main switch 10 and auxiliary switch 20 shown in FIG. 1. The control circuit 408 includes the ring oscillator 22, PFM control circuit 12, start judgment circuit 14, VDD judgment circuit 16, and VREF generator circuit 18 shown in FIG. 1. In the example shown in FIG. 8, the inductor L1 and capacitors C1, C2 shown in FIG. 1 are disposed external to the semiconductor chip area 400.

Referring to FIG. 9, the semiconductor chip area 400 shown in FIG. 8 is formed on a single, rectangular semiconductor chip 500. Formed on the semiconductor chip 500 are a semiconductor chip area 501 including an input/output circuit, a semiconductor chip area 502 including a series regulator, a semiconductor chip area 504 including an analog-to-digital converter, a semiconductor chip area 506 including a CPU (Central Processing Unit), a RAM (Random Access Memory), and a digital peripheral circuit, and a semiconductor chip area 508 including a flash memory as well as the semiconductor chip area 400 including the switching regulator.

In the microcomputer shown in FIG. 9, the CPU/RAM/digital peripheral circuit and the ring oscillator (FIG. 1) included in the switching regulator are formed by a core transistor. The input/output circuit is formed by an I/O transistor. The analog-to-digital converter and the flash memory are respectively formed by a necessary transistor.

As the auxiliary switch 20 requires less current driving force than the main switch 10, the transistor size of the auxiliary switch 20 can be small. This makes it possible to form the auxiliary switch 406 in a relatively small area adjacent to the main switch 404 as shown in FIG. 8. Therefore, the influence of auxiliary switch installation upon the chip area is small.

In the above description, it is assumed that the ring oscillator 22 shown in FIG. 1 is formed by a core transistor. However, the use of a transistor having a lower operating voltage than the core transistor (or a transistor used for a logic circuit element having a low logic threshold voltage) makes it possible to generate the internal supply voltage VDD from a lower external supply voltage VBAT.

In other words, even when the external supply voltage VBAT is relatively low, the ring oscillator 22 can oscillate as far as the transistors forming the ring oscillator 22 and auxiliary switch 20 can perform a switching operation. Therefore, even if the available voltage does not permit the other transistors forming the microcomputer to operate, the internal supply voltage VDD can be increased from the external supply voltage VBAT. After the internal supply voltage VDD is increased so as to make the other transistors operative, it is possible not only to disconnect the ring oscillator 22 and auxiliary switch 20, but also to supply the internal supply voltage VDD by allowing the PFM control circuit 12 to initiate an oscillation operation.

The presently disclosed embodiment is to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A microcomputer comprising:
   a switching power supply device that generates an internal supply voltage by increasing an externally supplied external supply voltage; and
   an internal circuit that operates upon receipt of the internal supply voltage,
   wherein the switching power supply device includes:
   an inductor that inputs the external supply voltage at one end thereof;
   a main switch that is coupled to another end of the inductor;
   an auxiliary switch that is coupled to the other end of the inductor in parallel with the main switch;
   a rectifier element that is coupled between the other end of the inductor and an output terminal;
   an auxiliary switch control circuit that is driven by the external supply voltage to provide on/off control of the auxiliary switch in accordance with a drive pulse having a predetermined frequency;
   a main switch control circuit that is driven by the internal supply voltage to provide on/off control of the main switch in accordance with the deviation between the internal supply voltage and a reference voltage; and a judgment circuit that is driven by the external supply voltage to judge whether the internal supply voltage has reached a voltage required to assure a normal operation of the main switch control circuit, and wherein, when the internal supply voltage is judged to have reached the voltage required to assure a normal operation of the main switch control circuit, the judgment circuit stops an operation of the auxiliary switch control circuit and enables the main switch control circuit.

2. The microcomputer according to claim 1,
wherein the internal circuit includes an input/output circuit that exchanges signals with the outside; and
wherein the external supply voltage is lower than the operating voltage of the input/output circuit.

3. The microcomputer according to claim 1,
wherein the internal circuit includes an input/output circuit that exchanges signals with the outside, and a logic circuit,
wherein the logic circuit is formed by a second transistor operating on a lower operating voltage than an operating voltage of a first transistor forming the input/output circuit,
wherein the main switch control circuit includes the first transistor, and
wherein the auxiliary switch control circuit includes the second transistor.

4. A switching power supply device for outputting a second supply voltage to an output terminal by increasing a first supply voltage supplied from an input terminal, the switching power supply device comprising:
   an inductor that inputs the first supply voltage at one end;
   a main switch that is coupled to another end of the inductor;
   an auxiliary switch that is coupled to the other end of the inductor in parallel with the main switch;
   a rectifier element that is coupled between the other end of the inductor and the output terminal;
   an auxiliary switch control circuit that is driven by the first supply voltage to provide on/off control of the auxiliary switch in accordance with a drive pulse having a predetermined frequency;
   a main switch control circuit that is driven by the second supply voltage to provide on/off control of the main switch in accordance with the deviation between the internal supply voltage and a reference voltage; and
   a judgment circuit that is driven by the first supply voltage to judge whether the second supply voltage has reached a voltage required to assure a normal operation of the main switch control circuit,
   wherein, when the second supply voltage is judged to have reached the voltage required to assure a normal operation of the main switch control circuit, the judgment circuit stops an operation of the auxiliary switch control circuit and enables the main switch control circuit.

5. A microcomputer comprising:
   a power supply circuit that generates an internal supply voltage by increasing an externally supplied external supply voltage,
   wherein the power supply circuit includes:
   a first oscillator capable of oscillating due to the external supply voltage;
   a first switching element controlled by an oscillation operation of the first oscillator;
   a second oscillator capable of oscillating due to the internal supply voltage that is generated by an oscillation operation of the first oscillator;
   a second switching element controlled by an oscillation operation of the second oscillator; and
   a judgment circuit, and
   wherein, in accordance with the result of judgment made by the judgment circuit to determine whether the voltage level of the internal supply voltage has reached the operating voltage of the second oscillator, the power supply circuit not only causes the second oscillator to start oscillating but also stops the first oscillator, and supplies the internal supply voltage, which is generated by the oscillation operation of the second oscillator, to a separate circuit block of the microcomputer.

* * * * *